United States Patent [19]

Wilkison et al.

[11] Patent Number: 5,245,654
[45] Date of Patent: Sep. 14, 1993

[54] SOLID STATE ISOLATION DEVICE USING OPTO-ISOLATORS

[75] Inventors: Dennis E. Wilkison; Don N. Lee, both of San Jose, Calif.

[73] Assignee: Cermetek Microelectronics, Inc., Sunnyvale, Calif.

[21] Appl. No.: 775,628

[22] Filed: Oct. 10, 1991

[51] Int. Cl.⁵ .............................................. H02H 3/22
[52] U.S. Cl. ................................ 379/405; 379/379; 379/399; 379/345; 359/189
[58] Field of Search ............ 379/379, 399, 405, 406, 379/345, 410, 402; 359/189, 157; 250/551

[56] References Cited

U.S. PATENT DOCUMENTS

| | | |
|---|---|---|
| 3,182,137 | 5/1965 | Beatty . |
| 4,031,332 | 6/1977 | Shylo . |
| 4,064,377 | 12/1977 | Regan ................... 379/405 X |
| 4,203,006 | 5/1980 | Mascia . |
| 4,360,784 | 11/1982 | Bartlett ....................... 330/9 |
| 4,417,099 | 11/1983 | Pierce ....................... 379/412 |
| 4,435,619 | 3/1984 | Bonaparte et al. ............. 179/17 R |
| 4,496,797 | 1/1985 | Price ....................... 379/412 |
| 4,529,845 | 7/1985 | Boeckmann ............... 379/412 X |
| 4,540,854 | 9/1985 | Beirne ....................... 379/345 |
| 4,567,331 | 1/1986 | Martin ....................... 379/345 |
| 4,638,167 | 1/1987 | Leseure et al. ............ 359/149 X |
| 4,679,115 | 7/1987 | Connan et al. ............. 379/379 X |
| 4,709,296 | 11/1987 | Hung et al. ................. 361/102 |
| 4,757,528 | 7/1988 | Falater et al. ............. 379/399 X |
| 4,782,525 | 11/1988 | Sylvain et al. ............. 379/345 X |
| 4,796,296 | 1/1989 | Amada et al. ............... 399/345 X |
| 4,803,719 | 2/1989 | Ulrich ....................... 379/399 |
| 4,864,605 | 9/1989 | Ramsay et al. .............. 379/379 |
| 4,899,381 | 2/1990 | Lee ....................... 379/393 |

OTHER PUBLICATIONS

Burr-Brown IC Data Book vol. 33, ISO100 Miniature Low Drift—Wide Bandwidth Isolation Amplifier, pp. 4-8 and 4-12 (1989).

Siemens data sheet for IL300 and IL300G Linear Optocouplers (Apr. 1991).

Cermetek brochure, Part Nos. CH1817 and 8117ET direct access arrangements.

*Primary Examiner*—James L. Dwyer
*Assistant Examiner*—M. Shehata
*Attorney, Agent, or Firm*—Townsend and Townsend Khourie and Crew

[57] ABSTRACT

An isolation circuit (20) that is devoid of coupling transformers and yet suitable for use as a telephone line interface. The circuit is characterized by very wide bandwidth, low noise, and high linearity. Opto-isolators couple analog transmit and receive channels in a user device (12) across an isolation barrier (57) to a line pair for full duplex communication on the line pair. The interface circuit, which also includes a hybrid (55), includes first and second oppositely directed linear optocouplers (50,52). The first is disposed between the transmit channel and the hybrid; the second between the receive channel and the hybrid.

7 Claims, 4 Drawing Sheets

SOLID STATE ISOLATION DEVICE USING OPTO-ISOLATORS

BACKGROUND OF THE INVENTION

The present invention relates generally to electronic circuitry and more particularly to isolation circuitry such as used in telephone line interface equipment.

The U.S. Federal Communications Commission and counterpart regulatory agencies in other countries require that user telephone equipment be isolated from the telephone network. The primary purpose of this requirement is to protect the network from damage due to such occurrences as faulty user devices and inadvertent shorts between user equipment and power lines. Specific requirements for such isolation vary somewhat from country to country (for example the U.S. requires 1500-volt isolation while other countries require as much as 4000-volt isolation), but the requirements are invariably stringent.

A typical telephone interface circuit (also known as a direct access arrangement or DAA) couples to the two-line network, and includes a duplexing circuit, referred to as a hybrid, that provides separate transmit and receive channels. The hybrid, which typically comprises a multiple winding transformer, may be balanced or unbalanced. The hybrid for telephones is typically unbalanced so as to provide a sidetone that allows the speaker to hear his/her own voice in the receiver. The hybrid for a modem or the like is balanced so that none of the transmitted signal is communicated into the receive channel. The DAA also provides a ring detection signal to the user equipment, and includes an off-hook relay for maintaining an open circuit on the network until the user device goes off-hook.

The vast majority of prior art DAAs use isolation transformers, although there has been some recent recognition that at least certain paths can be isolated using other techniques. For example, U.S. Pat. No. 4,864,605 to Ramsey et al. shows the use of a coupling transformer in the main signal path and opto-isolators in the ring detect, line condition detect, and off-hook detect circuitry. Somewhat analogously, U.S. Pat. No. 4,417,099 to Pierce discloses the use of opto-isolators in the digital portion of the data paths of a line-powered modem.

Transformers, while effective for isolation and coupling, are expensive, and are bulky and heavy relative to most solid state devices. Moreover, isolation transformers tend to be a leading source of failure in equipment which is subject to relatively heavy usage. In such applications, a transformer is most likely damaged internally or to be separated from its mounting and electrical connections by mechanical shock or vibration, due primarily to its mass.

One approach to eliminating the isolation and hybrid transformers is embodied in a DAA marketed by Cermetek Microelectronics, Inc. under the part number CH1817. Isolation is provided by two sets of high-value isolation resistors and associated components which act to isolate the send and receive portions of the user equipment from the telephone network.

SUMMARY OF THE INVENTION

The present invention provides an isolation circuit that is devoid of coupling transformers and yet suitable for use as a telephone line interface. The circuit is characterized by very wide bandwidth, low noise, and high linearity.

In brief, the present invention contemplates the use of opto-isolators to couple analog transmit and receive channels in a user device across an isolation barrier to a line pair for full duplex communication on the line pair. The interface circuit, which also includes a hybrid, includes first and second oppositely directed linear optocouplers. The first is disposed between the transmit channel and the hybrid; the second between the receive channel and the hybrid.

More specifically, a transmit optical isolation circuit has an input located on the user device side of the isolation barrier and an output on the line side of the barrier, and generates analog signals at its output corresponding to analog signals at its input. A receive optical isolation circuit has an input located on the line side of the barrier and an output on the user device side of the barrier and generates analog signals at its output corresponding to analog signals at its input.

A further understanding of the nature of advantages of the present invention may be realized by reference to the remaining portions of the specification and the attached drawings.

DESCRIPTION OF SPECIFIC EMBODIMENT(S)

Figure 1:
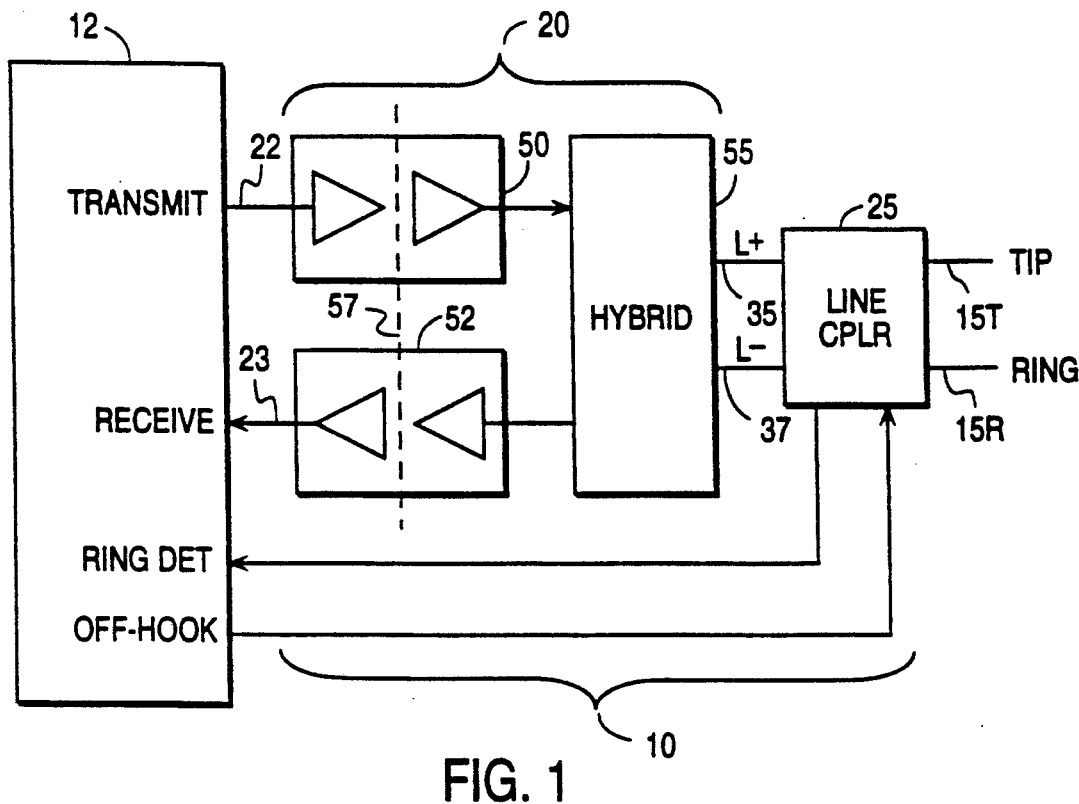
FIG. 1 is a block diagram illustrating a general configuration for interfacing a user device such as a modem to the telephone network, including isolation circuitry according to the present invention.

FIG. 1 is a block diagram showing a telephone interface, also referred to as a direct access arrangement (DAA) 10 for coupling a user device 12 to the telephone network. The network is shown as a pair of signal lines 15T and 15R, often referred to as "tip" and "ring." DAA 10 has, as its fundamental purpose, coupling a pair of analog signal channels (transmit and receive) to the phone line while providing a high level of DC isolation between the user device and the lines 15T and 15R. Other ancillary functions, which are almost always present, are surge suppression, rectification, off-hook detection, and ring detection.

DAA 10 includes an isolation circuit 20 coupled to user device 12 via transmit and receive lines 22 and 23, and a line coupler 25 connected to the lines 15T and 15R. The isolation circuit and line coupler communicate via a pair of signal lines 35 and 37, also designated L+ and L−, which generally correspond to tip and ring. References to "the line" will typically mean the L+ and L− line pair or the tip and ring line pair.

Viewed at a high level, the isolation circuit includes a transmit optical isolator circuit 50, a receive optical isolator circuit 52, and a hybrid 55. Optical isolator circuit 50 is disposed between the user device transmit channel and the hybrid; circuit 52 between the receive channel and the hybrid. Optical isolator circuits 50 and 52, to be described below, can be conceptionally viewed as providing communication of analog signals across an isolation barrier, shown schematically as a dashed line 57, without electrical connections thereacross. Hybrid 55 has the well-known function of interfacing the two-conductor line circuit (L+ and L−) to separate transmit and receive channels (normally considered to comprise four conductors) to permit full duplex operation.

Figure 2A:
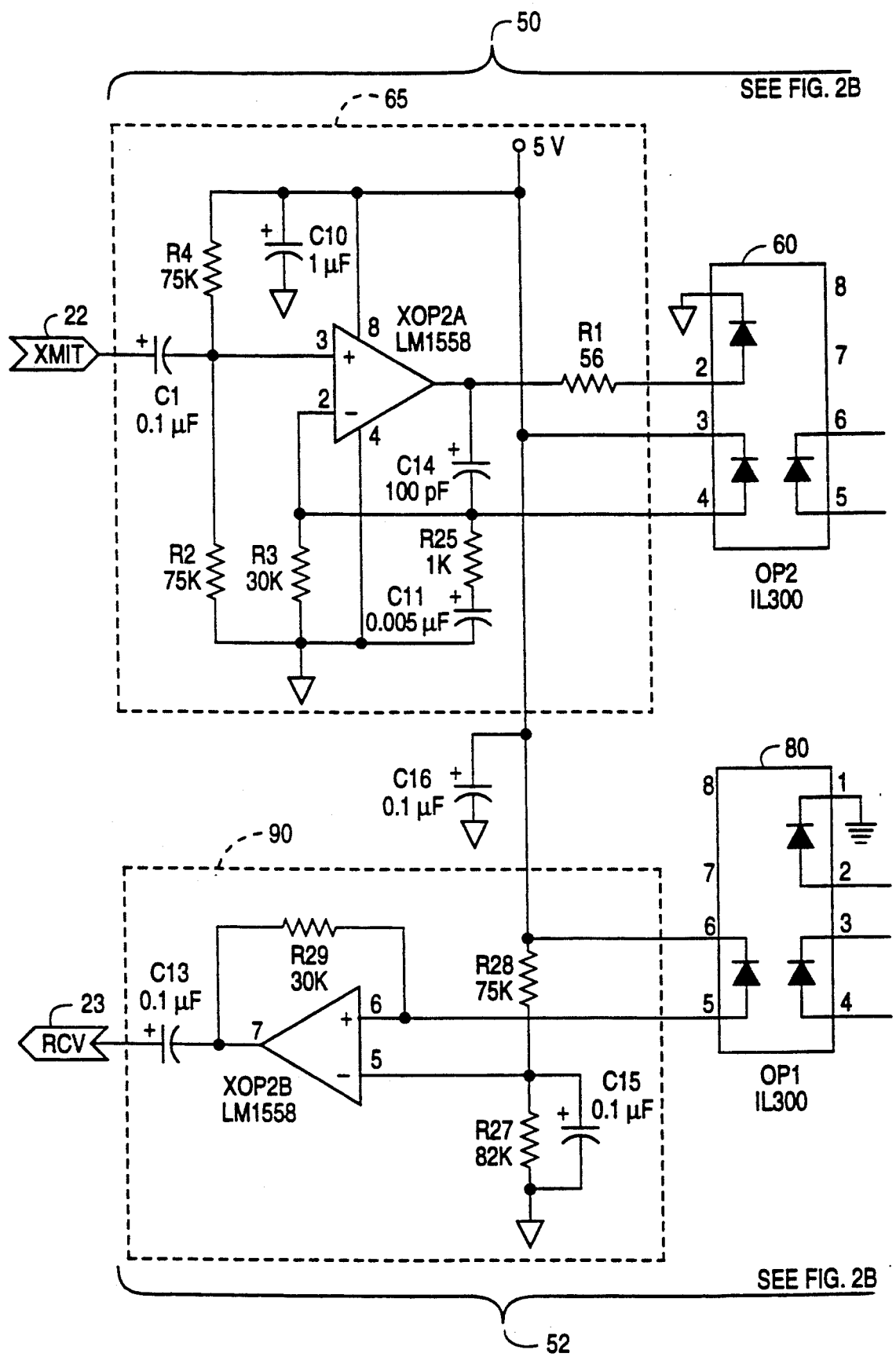
FIGS. 2A-2C provide a circuit schematic illustrating a preferred embodiment of the present invention.
Figure 2B:
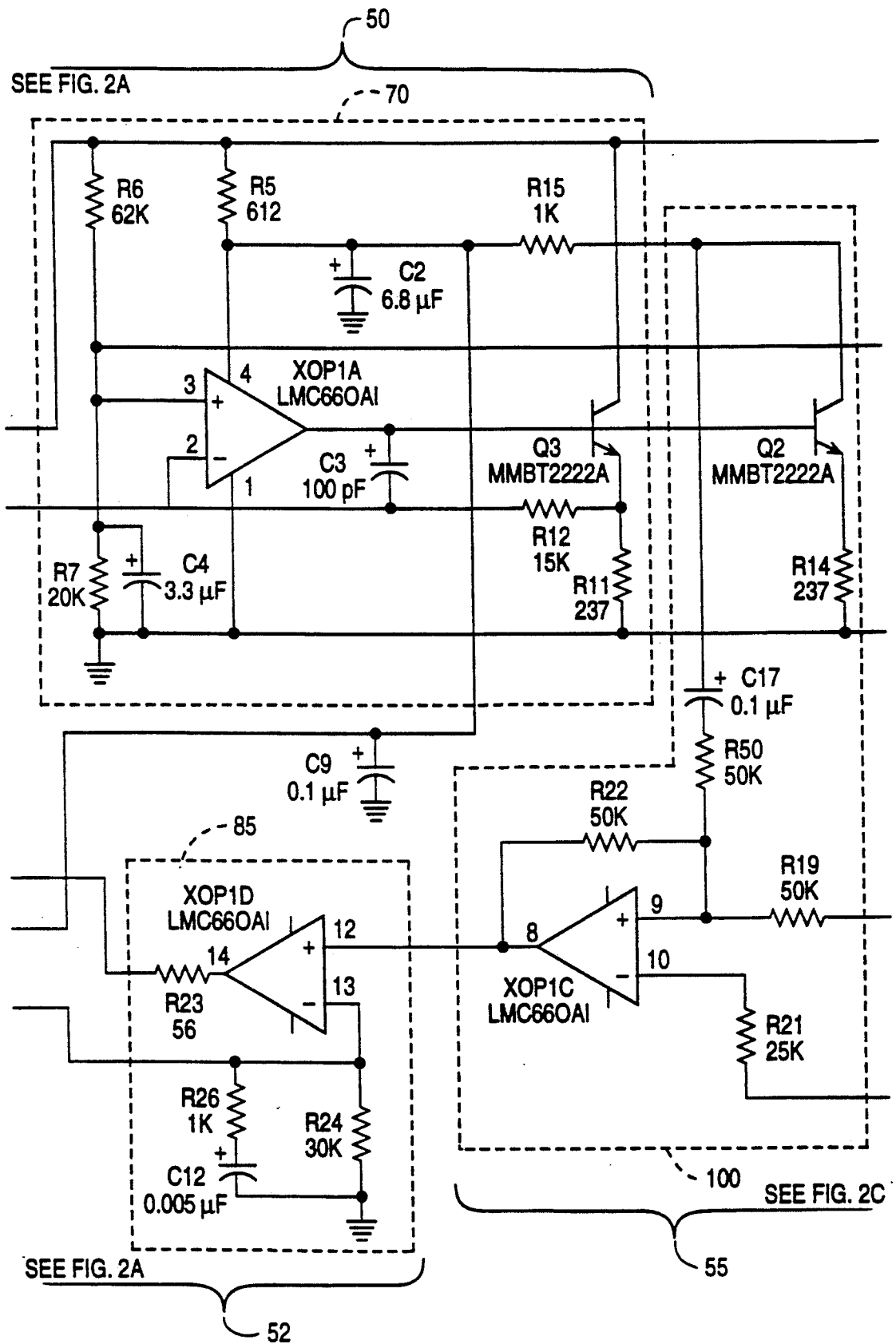
Figure 2C:
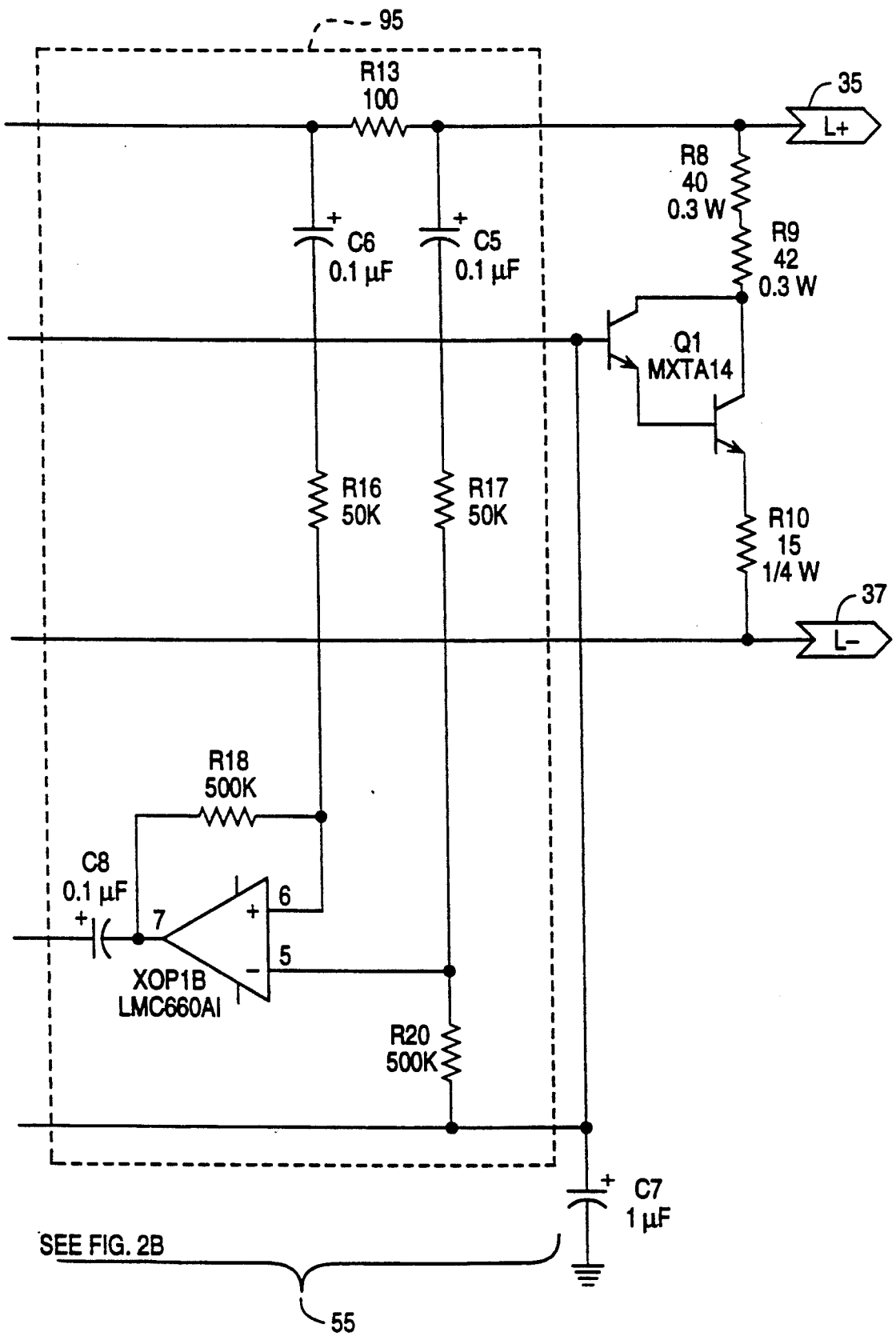

FIGS. 2A-2C provide a circuit schematic of a preferred embodiment of isolation circuit 20. The circuitry on the user device side of isolation barrier 57 requires electrical power from a source other than the phone line to operate. Therefore, the isolation circuit is best suited for user devices that can supply such power. This is the case for a separately-powered telephone device, such as a speakerphone, or a computer device such as a modem. In the case of a modem, the modem side of the isolation circuit receives its power from the modem or computer 5-volt power supply. The line side of the isolation circuit receives its power from the DC voltage (nominally 48 volts) on the line when the off-hook relay is closed. The isolation circuit operates to couple AC signals across barrier 57, and so references to signals, voltages, and currents will generally mean AC signals, voltages, and currents.

Optical isolator circuit 50 includes an opto-isolator (sometimes called an optocoupler) 60, a driver 65, and a current amplifier 70. The opto-isolator comprises an infrared LED irradiating a pair of matched PIN photodiodes in a bifurcated arrangement. One of the photodiodes provides the output signal and the other is used for feedback in the driver circuit to servo the LED drive current. The photodiodes are reverse biased so that they operate in the photoconductive mode where the current is directly proportional to the incident optical flux.

Driver 65 includes an operational amplifier (op amp) XOP2A having its non-inverting input coupled to transmit line 30 through a blocking capacitor C1 and its output coupled through a current-limiting resistor R1 to the anode of the opto-isolator's LED. The anode of the feedback photodiode is coupled to the inverting input of op amp XOP2A. This feedback connection, in cooperation with a resistor R25 and a capacitor C11, causes the op amp to provide enough LED current that the feedback photodiode current forces the voltage at the inverting input to track the signal voltage at the non-inverting input. Since the two photodiodes are matched, the current in the output photodiode tracks the current in the feedback photodiode and is thus proportional to the input voltage on transmit line 22.

Current amplifier 70 includes an op amp XOP1A configured as a transimpedance amplifier (current-to-voltage converter), and a transistor Q3 configured as a voltage-to-current converter. The op amp's non-inverting input is held at a fixed DC bias. The transistor's base is coupled to the op amp output and its collector is coupled to L+ line 35 through a resistor R13. The emitter of transistor Q3 is connected through a resistor R11 to L— line 37 and through a feedback resistor R12 to the op amp's inverting input and to the photodiode's anode. The result is that the op amp drives the transistor to maintain the emitter voltage at a level proportional to the photodiode current. Thus the current through the transistor is a scaled-up (by the ratio of R12/R11) version of the photodiode current. The transistor thus sets up currents in the L+ and L— lines proportional to the voltage on transmit line 22.

Optical isolator circuit 52 includes an opto-isolator 80, a driver 85, and a current-to-voltage amplifier 90. Driver 85 includes an op amp XOP1D having its non-inverting input coupled to receive the output signal from hybrid 55 and its output coupled to the anode of the LED in opto-isolator 80. The anode of the feedback photodiode is coupled to the inverting input of op amp XOP1D to provide the same servo control described above in connection with opto-isolator 60. Current-to-voltage converter 90 comprises an op amp XOP2B having its inverting input coupled to the anode of the output photodiode in the opto-isolator and its output coupled to receive line 23 through a blocking capacitor C13. The op amp's output impedance is low enough that the output signal can be used directly by the user device.

Hybrid 55 can be considered to comprise two portions, a first portion 95 that provides a voltage signal equal to the superposition of the outgoing and incoming currents on the line, and a second portion 100 for removing a desired fraction of the outgoing signal. For voice communication, a small amount of the outgoing signal (speaker's voice) would be allowed to pass through the receive channel so that the speaker could hear his/her voice. For modem applications and the like, circuit 100 provides substantially total elimination of the outgoing signal from the receive channel.

The mechanism for generating a voltage proportional to the total current flowing in the line includes resistor R13, which is interposed in the L+ line, and a differential amplifier that includes an op amp X0P1B and a resistor network (R16, R17, R18, R20). The voltages at both ends of resistor R13 are communicated through respective blocking capacitors C5 and C6 and respective resistors R17 and R16 to the non-inverting and inverting inputs of op amp XOP1B, which provides an output voltage proportional to the superposition of the outgoing and incoming signals.

The mechanism for removing the outgoing signal is provided by a transistor Q2 and a resistor R14, which are closely matched to transistor Q3 and resistor R11 in current amplifier 70. The base of transistor Q2 receives the same voltage as the base of transistor Q3, and therefore an equal current flows through transistor Q2. The collector of transistor Q2 is coupled to a filtered DC level through a resistor R5, and therefore the collector voltage is given by the product of the resistance of resistor R15 and the current, which is equal to the current resulting from the transmit signal. The resulting voltage at the collector is communicated through a blocking capacitor C17 to an analog adder that includes an op amp XOP1C and a resistor network (R19, R22, R30) The adder also receives the output signal from op amp XOP1B (the differential amplifier).

The voltages are received with opposite polarity relative to the transmit signal, and so they combine subtractively. Since the transmit component of the current through resistor R13 and the matched current through resistor R15 are equal, the voltages developed are proportional to the respective resistor values. Since resistor R13 is in series with the line, it should have a relatively small value. Resistor R15 is not so constrained, and typically should have a higher value. To account for this, the resistor network associated with the differential amplifier is configured to provide a relative gain (in this case a gain of 10), to account for the fact that the voltages differ by the same ratio. Thus, the voltage generated by transistor Q2 matches the outgoing voltage component from the differential amplifier, and the two cancel. Therefore, the output of op amp XOP1C is proportional to incoming signal on the line.

A DC load on the L+ and L— lines is provided by a Darlington transistor Q1 and a set of resistors R8, R9, and R10. A voltage divider comprising resistors R6 and R7 establishes the voltage on the base of Darlington transistor Q1 (and also provides the DC bias for the non-inverting input of op amp XOP1A). This voltage, along with resistor R10, which is between the emitter and the L− line, determines the current flow, while resistors R8 and R9 in the Darlington collector circuit protect the transistor.

Although part types and values are subject to some variation, those shown on the schematic represent the presently preferred embodiment. The opto-isolators are commercially available from the Optoelectronics Division of Siemens Components, Inc., Cupertino, Calif. under the part number IL300. The op amps are standard parts, in dual or quad packages. The transistors are surface mount devices. The resistors can be surface mount devices, or can be fabricated by thick-film techniques on a ceramic substrate if an additional level of miniaturization is required. The unpolarized (below 1 µf) capacitors are ceramic type while the polarized (1 µf and above) are tantalum type.

Figure 3:
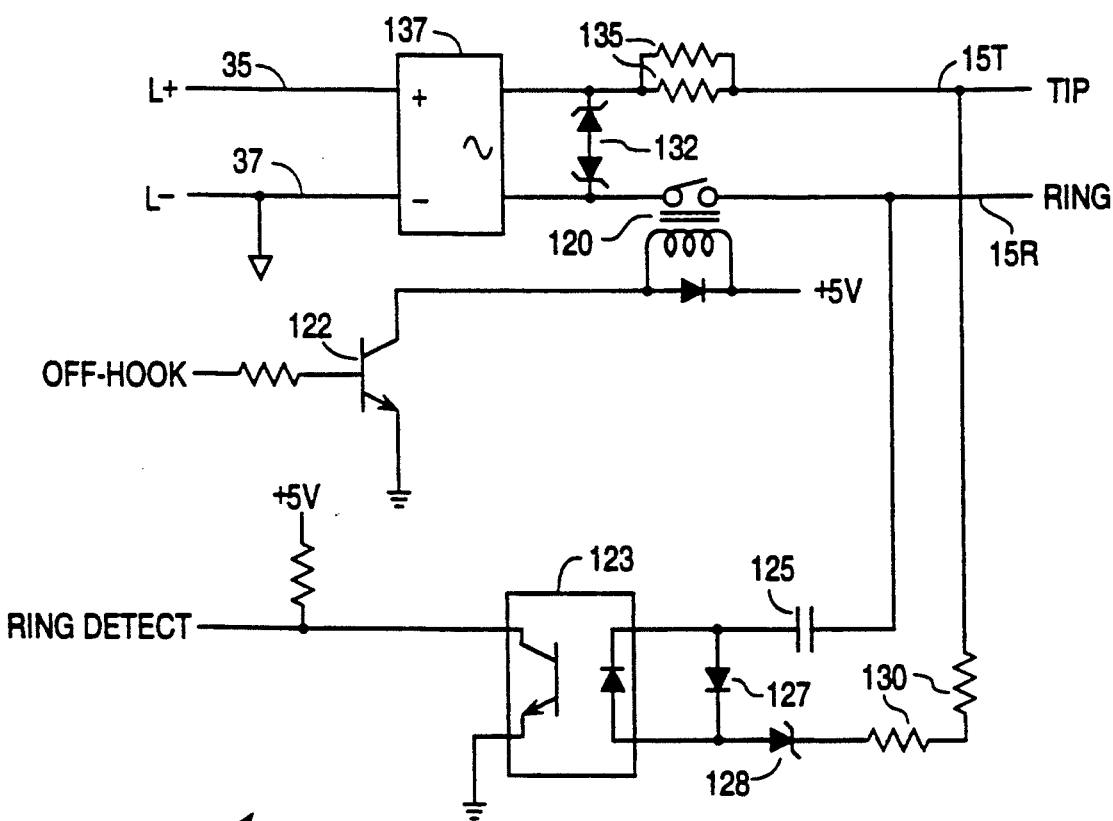
FIG. 3 is a circuit schematic of a representative line coupler.

FIG. 3 is a circuit schematic illustrating a representative configuration for line coupler 25. Line coupler 25 is not part of the present invention, but as a practical matter will normally be associated with it. An off-hook relay 120 is interposed in the ring line, and is controlled by the off-hook signal as communicated through a transistor 122. Ring detect is provided via an opto-isolator 123 whose LED is connected to an input network that includes a blocking capacitor 125, a rectifying diode 127, a Zener diode 128, and coupling resistors 130. The ring detect signal is maintained at +5 volts relative to equipment ground and is pulled low when current flows through the opto-isolator LED. Surge protection is provided by a voltage limiter 132 (a pair of back-to-back Zener diodes) across tip and ring lines 15T and 15R, and limiting resistors 135 interposed in the tip line. A bridge rectifier 137 is coupled between the tip and ring lines in order to ensure proper polarity of the L+ and L− signals, regardless of the polarity with which the line coupler is connected to the network.

In conclusion, it can be seen that the present invention provides a very effective isolation technique that avoids the use of transformers while providing at least 4000-volt isolation. The resulting circuit is very linear and characterized by high bandwidth (hundreds of kHz) with inherently low noise. The feedback in voltage-to-current converter 70, the matched currents in hybrid 55, and the feedback in the opto-isolators contribute to provide self-correcting circuitry whose performance is achieved through design rather than relying on manufacturing tolerances.

While the above is a full description of the preferred embodiments, various modifications, alternative constructions, and equivalents may be used. Therefore, the above description should not be taken as limiting the scope of the invention which is defined by the appended claims.

We claim:

1. An isolation circuit for connecting analog transmit and receive channels in a user device to a line pair for full duplex communication on the line pair while providing an electrical isolation barrier between the user device and the line pair, comprising:

transmit optical isolation means, having an input located on the user device side of the barrier and an output on the line side of the barrier and being responsive to signals at its input, for generating analog signals at its output linearly corresponding to analog signals at its input;

said transmit optical isolation means comprising a monolithic opto-isolator having an LED and first and second photodiodes, each photodiode, on being reverse biased, delivering a current proportional to the optical flux incident thereon, and a driver coupled between the transmit channel and said opto-isolator in a feedback configuration such that each of said first and second photodiodes delivers a current proportional to a voltage signal from the transmit channel;

receive optical isolation means, having an input located on the line side of the barrier and an output on the user device side of the barrier and being responsive to signals at its input, for generating analog signals at its output linearly corresponding to analog signals at its input;

means, devoid of coupling transformers, for coupling the input of said transmit optical isolation means to the transmit channel;

means, devoid of coupling transformers, for coupling the output of said receive optical isolation means to said receive channel; and duplexing means, devoid of coupling transformers and coupled to the line pair, (a) for directing signals generated at the output of said transmit optical isolation means onto the line pair, (b) for directing signals on the line pair to the input of said receive optical isolation means, and (c) for preventing at least a portion of any signals on the line pair that correspond to signals generated at the output of said transmit optical isolation from reaching the input of said receive optical isolation means;

the isolation circuit being devoid of coupling transformers.

2. The isolation circuit of claim 1 wherein said duplexer means operates to prevent substantially all signals on the line pair that correspond to signals generated at the output of said transmit optical isolation means from reaching the input of said receive optical isolation means.

3. The isolation circuit of claim 1 wherein said duplexer means comprises:

means for generating a first signal that represents a superposition of all signals on the line pair;

means for generating a second signal that represents the signal that is generated at the output of said transmit optical isolation means;

means, responsive to said first and second signals, for subtracting said second signal from said first signal to define a third signal; and means for applying said third signal to the input of said receive optical isolation means.

4. The isolation circuit of claim 1 wherein said receive optical isolation means comprises:

a monolithic receive opto-isolator having a receive LED and first and second receive photodiodes, each receive photodiode, on being reverse biased, delivering a current proportional to the optical flux incident thereon;

a receive driver having an input terminal, said receive driver being coupled to said receive opto-isolator in a feedback configuration such that each of said first and second receive photodiodes delivers a current proportional to a voltage signal at said input terminal of said receive driver.

5. An isolation circuit for connecting analog transmit and receive channels in a user device to a line pair for full duplex communication on the line pair while providing an electrical isolation barrier between the user device and the line pair, comprising:

a monolithic transmit opto-isolator having an LED and first and second photodiodes, each photodiode in said transmit opto-isolator, on being reverse biased, delivering a current proportional to the optical flux incident thereon;

a transmit driver coupled between the transmit channel and said transmit opto-isolator in a feedback configuration such that each of said first and second photodiodes in said transmit opto-isolator delivers a current proportional to the voltage signal from the transmit channel;

a transmit current amplifier having an input terminal coupled to said first photodiode in said transmit opto-isolator and having an output terminal;

a monolithic receive opto-isolator having an LED and first and second photodiodes, each photodiode in said receive opto-isolator, on being reverse biased, delivering a current proportional to the optical flux incident thereon;

a receive driver having an input terminal, said receive driver being coupled to said receive opto-isolator in a feedback configuration such that each of said first and second photodiodes in said receive opto-isolator delivers a current proportional to a voltage signal at said input terminal of said receive driver;

a receive current-to-voltage amplifier coupled between said first photodiode in said receive opto-isolator and the receive channel; and duplexing means, devoid of coupling transformers and coupled to the line pair, (a) for directing signals generated at said output terminal of said transmit current amplifier onto the line pair, (b) for directing signals on the line pair to said input terminal of said receive driver, and (c) for preventing at least a portion of any signals on the line pair that correspond to signals generated at said output terminal of said transmit current amplifier from reaching said input terminal of said receive driver;

the isolation circuit being devoid of coupling transformers.

6. The isolation circuit of claim 5 wherein said duplexer means operates to prevent substantially all signals on the line pair that correspond to signals generated at said output terminal of said transmit current amplifier from reaching said input terminal of said receive driver.

7. The isolation circuit of claim 5 wherein said duplexer means comprises:

means for generating a first signal that represents a superposition of all signals on the line pair;

means for generating a second signal that represents the signal that is generated at said output terminal of said transmit current amplifier;

means, responsive to said first and second signals, for subtracting said second signal from said first signal to define a third signal; and means for applying said third signal to said input terminal of said receive driver.

* * * * *